(12) United States Patent
Yakubenko et al.

(10) Patent No.: US 12,282,998 B2
(45) Date of Patent: Apr. 22, 2025

(54) SYSTEM FOR GENERATION OF THREE DIMENSIONAL SCANS AND MODELS

(71) Applicant: Occipital, Inc., Boulder, CO (US)

(72) Inventors: Anton Yakubenko, Boulder, CO (US); Kirill Osipov, Kaluga (RU); Timur Ibadov, Odintsovo (RU); Ivan Malin, Moscow (RU); Sergii Dubrovskyi, Kharkov (UA); Alex Schiff, New York, NY (US); Gleb Krivovyaz, Moscow (RU)

(73) Assignee: Occipital, Inc., Boulder, CO (US)

( * ) Notice: Subject to any disclaimer, the term of this patent is extended or adjusted under 35 U.S.C. 154(b) by 88 days.

(21) Appl. No.: 17/806,305

(22) Filed: Jun. 10, 2022

(65) Prior Publication Data

US 2022/0398804 A1    Dec. 15, 2022

Related U.S. Application Data

(60) Provisional application No. 63/202,460, filed on Jun. 11, 2021.

(51) Int. Cl.
*G06T 17/05* (2011.01)
*G06T 7/60* (2017.01)
*G06T 17/10* (2006.01)

(52) U.S. Cl.
CPC ............ *G06T 17/05* (2013.01); *G06T 7/60* (2013.01); *G06T 17/10* (2013.01)

(58) Field of Classification Search
CPC .................................................. G06T 17/05
See application file for complete search history.

(56) References Cited

U.S. PATENT DOCUMENTS

| | | | | |
|---|---|---|---|---|
| 2020/0187911 A1* | 6/2020 | Park | ................. | A61B 8/587 |
| 2021/0004933 A1* | 1/2021 | Wong | ................. | G06T 7/174 |
| 2021/0142579 A1* | 5/2021 | Jeong | ................. | G06T 7/251 |
| 2021/0279943 A1* | 9/2021 | Murez | ................. | G06T 17/00 |
| 2021/0374297 A1* | 12/2021 | McDade | ........... | G06Q 30/0283 |
| 2022/0301192 A1* | 9/2022 | Boardman | .......... | G06T 7/579 |
| 2022/0343537 A1* | 10/2022 | Taamazyan | .......... | G06V 10/82 |

\* cited by examiner

*Primary Examiner* — Samantha (Yuehan) Wang
(74) *Attorney, Agent, or Firm* — Lee & Hayes, P.C.

(57) ABSTRACT

A system for generating three-dimensional models of an exterior physical environment such as the exterior of a building. In some cases, the system may utilize third-party data to supplement data captured at the physical environment when generating the three-dimensional models. The system may also utilize third-party data to assist with aligning models of an exterior of a building with an interior of the building.

20 Claims, 11 Drawing Sheets

SYSTEM FOR GENERATION OF THREE DIMENSIONAL SCANS AND MODELS

CROSS-REFERENCE TO RELATED APPLICATION(S)

This application claims priority to U.S. Provisional Application No. 63/202,460 filed on Jun. 11, 2021 and entitled "A SYSTEM FOR GENERATION OF 3D SCANS AND MODELS," which is incorporated herein by reference in its entirety.

BACKGROUND

The presence of three-dimensional (3D) sensing and imaging is becoming more and more common in industries such healthcare, printing, and augmented reality (AR). In this regards, 3D sensors are increasingly being adopted and integrated into mobile or hand-held electronic devices. However, they systems for generating the 3D models are usually designed with small interior environments in mind. As such, these systems are often ill suited for generating models of exterior environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
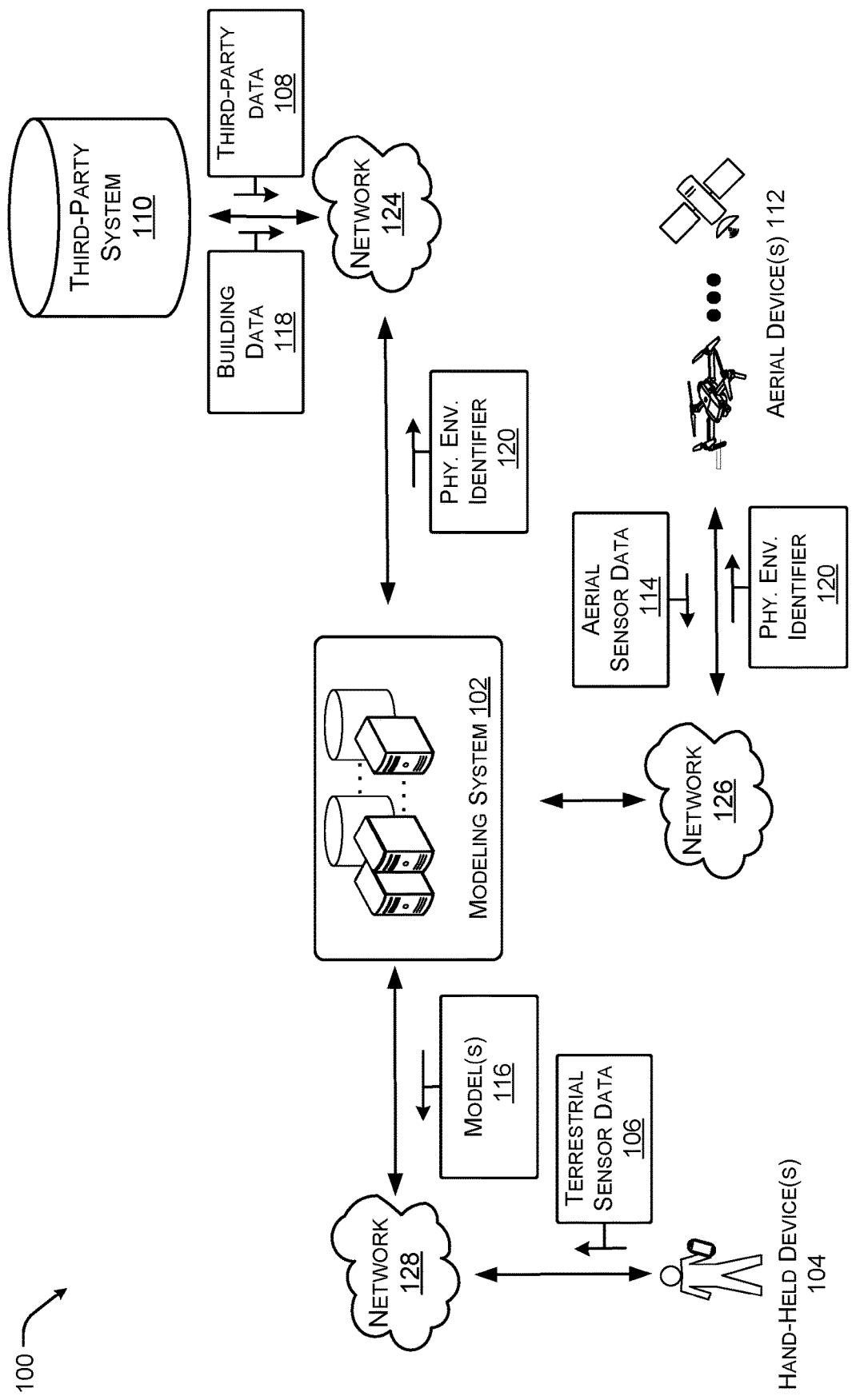
FIG. 1 is an example block diagram of a system for generating three-dimensional models including an exterior physical environment according to some implementations.

This disclosure includes techniques and systems for generating three-dimensional models that include representations of exterior physical environments. In some cases, the models may represent both interior and exterior aspects of, for instance, buildings and the like. In some implementations, the system, discussed herein, may receive and/or capture image data and/or depth data from a hand-held device or sensor system. The captured image data and/or depth data may be associated with an exterior environment, such as the exterior of the building or other object of interest.

In some cases, portions of the building or object of interest may be obstructed, such as by one or more trees, bushes, or other environmental objects. Additionally, the image data and/or depth data may include gaps or holes, such as resulting from portions of the object of interest being out of range from, for instance, the depth sensor or unscannable from the ground. For example, the depth sensor may have a limited range and the user may have to capture the data from areas distant from the object of interest, such as across the street. Likewise, portions of the object of interest may not be visible to the hand-held device or the user, such as portions of the roof of a multi-story building.

Accordingly, the system discussed herein may incorporate aerial image and depth data as well as third-party data into the three-dimensional models. For example, the system may utilize image and/or depth data captured by one or more autonomous or remote controlled aerial vehicles, satellites, and/or hosted by publicly available third-party databases to complete the 3D model. For example, satellite image data of the roof or top of an object of interest may be used to complete the model when data from the hand-held device is unable to scan the area.

In other cases, the system may detect gaps or holes (or portion of a scan with insufficient details) as the user is scanning or capturing the image data and depth data. The system may then utilize the display and/or speakers of the device to provide scanning recommendations, instructions, or trajectories to improve the overall quality and details associated with the captured data and, accordingly, the resulting 3D model. For example, the system may generate a mesh or other initial model of the object of interest as the user is scanning and provide highlights (such as colored, circled, or other visual indication) of areas of the model in which additional image data would improve the resulting model. In some cases, the system may ask the user to capture still image data or video data based on results of the currently processed data. In some cases, the system may recommend scanning distances or locations that may improve the quality and/or quantity of the data associated with the object of interest, such as moving closer to the object to improve the depth data available when the user is out of range of the depth sensor of the capture device.

In some examples, the system may also align the model of the exterior of the object of interest with models of the interior of the object of interest (such as aligning the interior of a building with the exterior to complete a whole building or home model). In some cases, the system may utilize architectural or building codes (such as wall thickness) to assist with aligning the interior and exterior models of an object of interest. In some cases, the system may align the models using windows, doors, or other features present in both the exterior and interior models. In some cases, the system may first align a scale between the interior model and the exterior model using the architectural or building codes or other known construction data, such as wall thickness, floor thickness, standard window sizes, standard door or door frame sizes, material sizes (such as brick or siding widths or lengths), step heights, and the like. Once the scales are aligned the system may utilize the shared features and known world assumptions (such as Manhattan world assumptions) to align the interior and exterior models. In some cases, the system may also generate a shape associated with each model and pre-align the models based on the shape prior to perform detailed alignment aligning based on shared features.

FIG. 1 is an example block diagram 100 of a modeling system 102 for generating three-dimensional models including an exterior physical environment according to some implementations. In the current example, the system 102 is shown as a cloud-based service but it should be understood that some or all of the processing performed by the modeling system 102 may be hosted, such as a downloadable application, on the hand-held device 104 being operated to generate the captured data of the object of interest. In this manner, the system 102 may be cloud-based, partially cloud-based, or hosted locally on an end user device.

In the current example, a user may operate the hand-held device 104 to capture sensor data 106 (such as depth data, visual or image data, orientation and position data, and the like) associated with an object of interest. As discussed above, in some cases, the system 102 and the device 104 may be used to generate a model 116 of an exterior of a building, home, or the like. In some cases, the building may be multi-story or otherwise difficult to scan (e.g., capture sensor data 106 of object of interest) from a terrestrial (ground-based) position using the device 104. In these cases, the system 102 may request, receive, access, or otherwise obtain third-party data 108 associated with the object of interest. For example, the system 102 may utilize a physical environment identifier 120 (such as an address, the position and orientation data of the device, the GPS data associated with the device) to access one or more third-party systems 110 that may include image data or other information known about the object of interest (e.g., the building). As a specific example, the system 102 may access social media accounts, map-based services, or other publicly available services to receive third-party image data of the building.

The system 102 may also utilize one or more aerial device 112 to capture of receive aerial sensor data 114 of the building. Again, the system 102 may utilize the physical environment identifier 120 (e.g., the address, the position and orientation data of the device, the GPS data associated with the device) to access one or more devices or services 112 that may provide aerial sensor data 108. For example, the system 102 may utilize an automated aerial vehicle, such as a drone, to capture sensor data 114 from positions or views that a user is otherwise unable to access. In other examples, the system 102 may access satellite based sensor data, such as image data, terrain data, heat maps, or the like that may be captured from a satellite or other geographic mapping based service that is available to the system 102.

The modeling system 102 may merge or otherwise combine the terrestrial sensor data 106, the third-party data 108, and the aerial sensor data 114 into a single model 116 of the exterior of the building or object of interest. For example, the system may utilize one or more machine learned models or networks (such as a neural network) to segment and/or classify the sensor data 106, 108, and 114 and then combine the segmented and classified data as an initial model 116. For example, the system 102 may segment and/or classify the data 106, 108, and 114 into features of the building, such as walls, roof, windows, and the like and then combine the segmented and/or classified data into the model 116 based on the classifications.

In some examples, the system 102 may also align exterior models 116 with interior models of the same building or object of interest. In these cases, the system 102 may first align a scale between the model of the interior and the model 116 of the exterior. In some case, the system 102 may request, receive, access, or otherwise obtain building data 118 using the physical environment identifier 120 as with the third-party data 108. The building data 118 may include building standards or codes, architectural codes, material data (e.g., sizes of bricks, siding, windows, and the like). The system 102 may then use segmented and classified features of the models 116 (e.g., both interior and exterior) to determine a scale. For example, the system 102 may utilize the size of a brick on the exterior of the building to scale the model 116 of the exterior to the actual physical scale. Likewise, the system 102 may utilize a standard step height or modeling dimensions to scale the interior model 116 to the actual physical scale. The system 102 may also utilize standard wall thicknesses and/or floor thicknesses to assist with aligning the exterior and interior models 116 with each other. For example, the system 102 may maintain a gap between the interior and the exterior models 116 based on the standard wall thickness.

In some cases, once the scales are aligned (e.g., both aligned to an actual physical scale), the system 102 may merge the models 116 using features visible in both models (such as windows, doors, and the like). In some cases, the system 102 may generate a shape for each of the models 116 (e.g., exterior and interior) and initially or coarsely align the models 116 using the shape. The system 102 may then perform a more fine or detailed alignment using the shared features (which after coarse alignment should be approximate or within a distance threshold to each other).

FIGS. 2-10 are a flow diagrams illustrating example processes associated with generating a three-dimensional models according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 2:
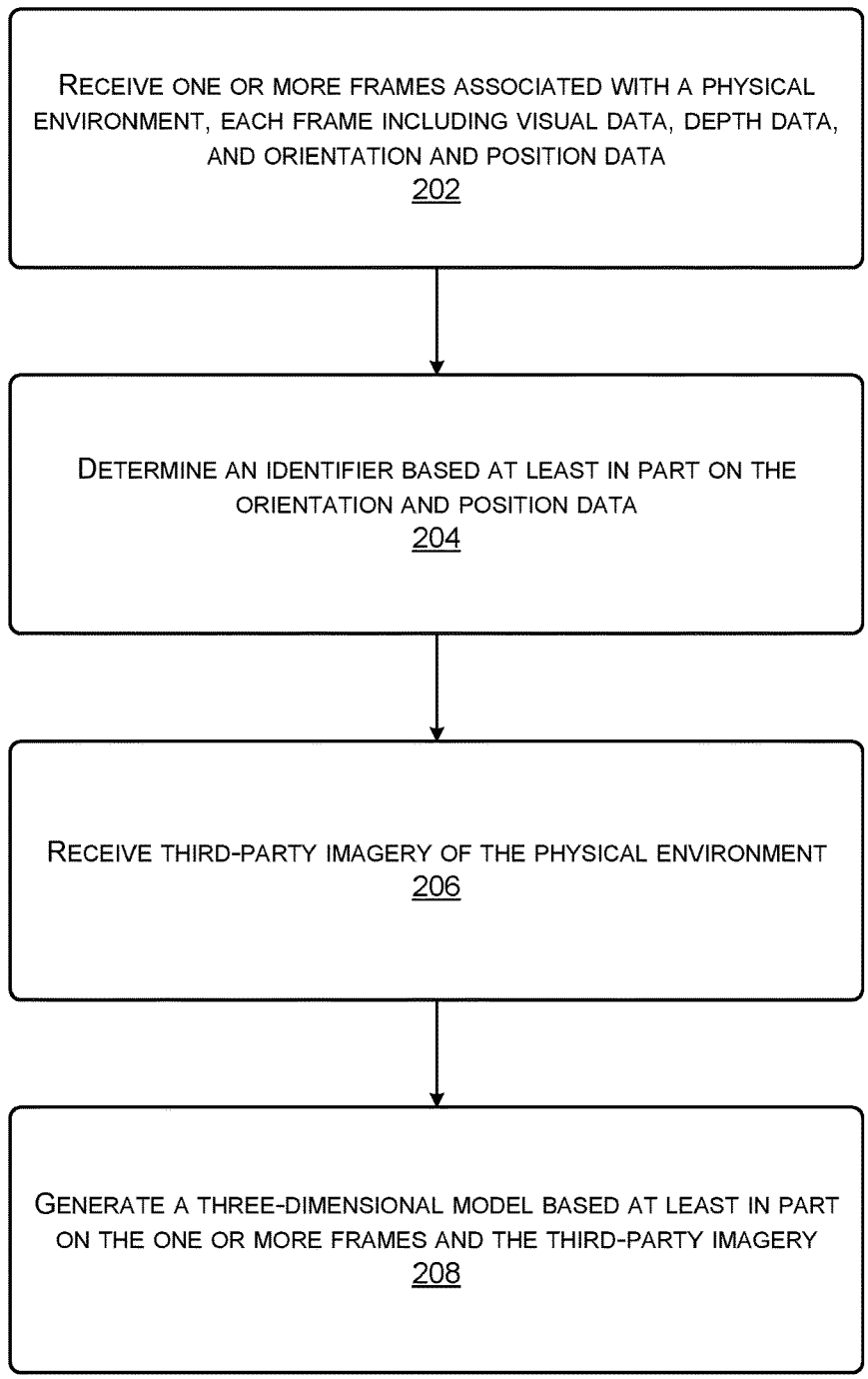
FIG. 2 illustrates an example flow diagram showing a process for generating a three-dimensional model according to some implementations.

FIG. 2 illustrates an example flow diagram showing a process 200 for generating a three-dimensional model according to some implementations. As discussed above, a user may utilize a hand-held electronic device to capture sensor data (such as image data, video data, depth data, orientation and/or position data, and the like) associated with an exterior of an object of interest (such as a building). However, some portions or features of the building may be difficult to scan (e.g., generate the sensor data). In these cases, the system may be configured to access or obtain data associated with the building via third-party systems, such as map services, satellite systems, social media systems, government systems, and the like.

At 202, the system may receive one or more frames associated with a physical environment. For example, the physical environment may be the exterior environment associated with a building. The one or more frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like).

At 204, the system may determine an identifier for the physical environment based at least in part on the orientation and position data. For example, the system may determine an address of the building using the location data (such as GPS data) or the like.

At 206, the system may receive third-party imagery of the physical environment. For example, the system may access satellite data, third-party images, government data, or the like of the building. For example, the system may access or receive data from real-estate listing service, social media services (e.g., tagged buildings), map data from mapping services, street images based on a map or street view service, and the like.

At 208, the system may generate a 3D model based at least in part on the one or more frame and the third-party imagery. For example, the system may combine the frames with the third-party imagery to complete features such as roofs that are often lacking detail or include gaps or holes when the building is scanned from the ground level. In some cases, the system may utilize one or more machine learned models or networks to segment, classify, and/or combine the one or more frames and the third-party imagery.

Figure 3:
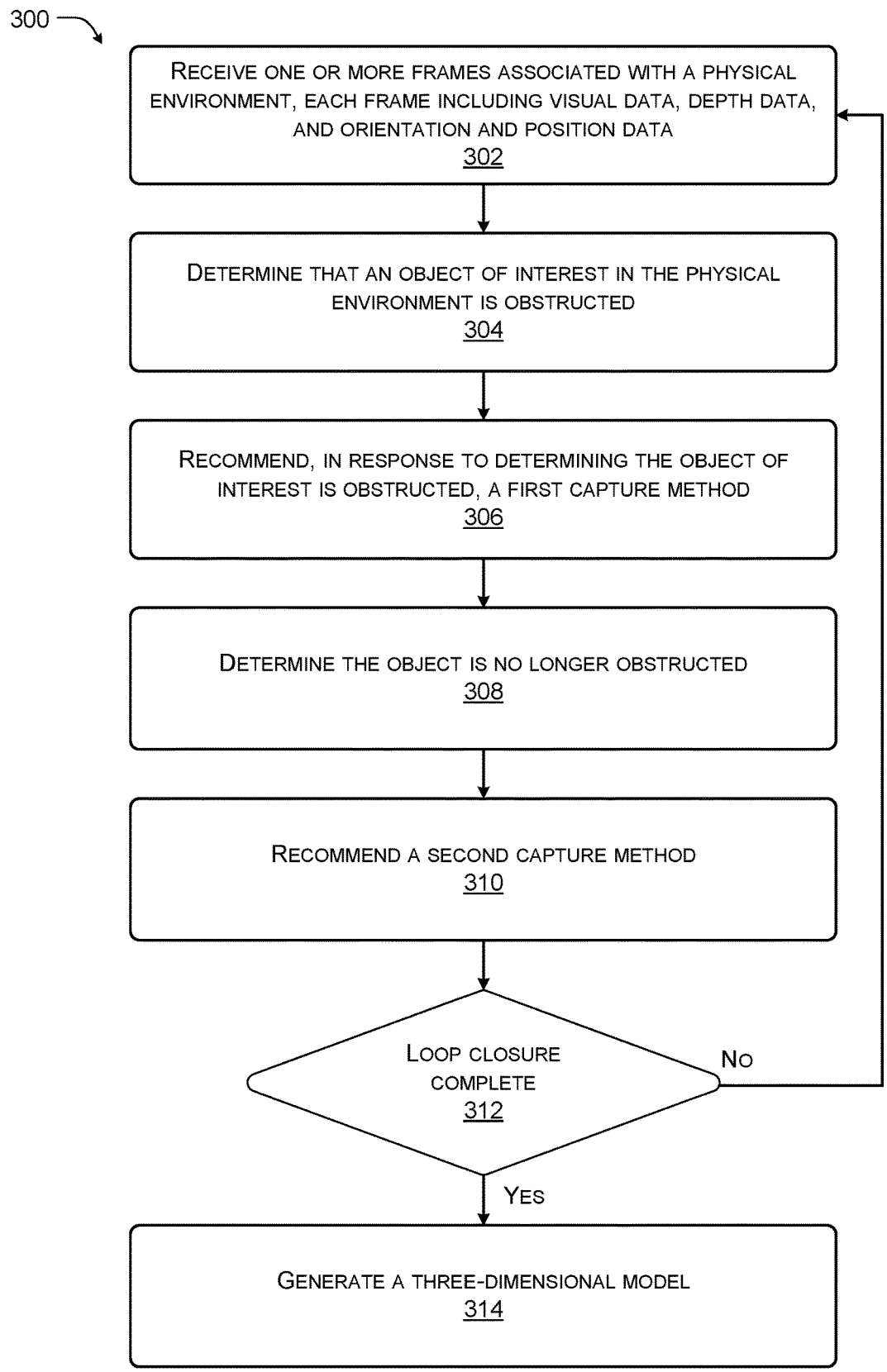
FIG. 3 illustrates an example flow diagram showing a process for capturing sensor data usable to generate a three-dimensional model according to some implementations.

FIG. 3 illustrates an example flow diagram showing a process 300 for capturing sensor data usable to generate a three-dimensional model according to some implementations. In some cases, as the user scans (e.g., generates the sensor data) an object of interest (such as a building), the object of interest may be obstructed from the field of view of the scanning device (e.g., the hand-held electronic device) being used to capture the sensor data. For instance, a bush, tree, or other obstruction may be partially or fully blocking the sensors from capturing data associated with the object of interest.

At 302, the system may receive one or more frames associated with a physical environment. For example, the physical environment may be the exterior environment associated with a building. The one or more frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like).

At 304, the system may determine that the object of interest in the physical environment is obstructed. For example, the system may segment and/or classify the features of one or more frames and determine based on the segmentation and/or classification that the features of the object of interest are blocked by features of the obstruction. In some cases, the system may determine that a level of detail of the features of the object of interest are less than one or more thresholds and, accordingly, the system may be unable to accurately generate a 3D model of the object of interests without additional data. In other examples, the system may utilize the depth data to determine that the object of interest is obstructed, such as a change in the depth of the sensor data that is greater than a threshold may indicate an obstruction given the user's current scanning location.

At 306, the system may recommend, in response to determining that the object of interest is obstructed, a first capture method. For example, the system may recommend switching a setting or capture method of the scanning device, such as capturing still images, sparse photos, videos, or the like. In some cases, the system may utilize the depth data and/or the frames to recommend a different capture position or field of view that may provide additional or more accurate data. In some cases, the system may recommend the user move closer or further from the object of interest. As one specific example, the system may request the user move or zoom in and out on the object of interest to assist with improving the quality or detail associated with the sensor data.

At 308, the system may determine the object of interest is no longer obstructed. For example, as the user moves to scan different portion of the object of interest or to a different field of view (e.g., capture position), the system may determine from the frames (e.g., the segmented and/or classified features) another change in the depth data (e.g., a return to within a threshold distance of the object of interest in prior frames), or the like that the user is again capturing unobstructed sensor data of the object of interest.

At 310, the system may recommend a second capture method. For example, the system may recommend the user return to video capture or return to scanning the object of interest as the user desires. In some cases, the system may recommend the user return to an initial or specific distance from the object of interest or otherwise return to normal scanning.

At 312, the system may determine that a loop closure has been completed or that sufficient data associated with the object of interest has been captured to generate a 3D model. For example, as the user scans the object of interest in a 360 degree manner, the system may determine that the features of the frames match or align with the features from the initial capture position (e.g., when a user has scanned all the way around a building). If the loop closure is complete, the process 300 proceeds to 314. Otherwise, the process returns to 302 and the user continues to capture sensor data associated with the object of interest.

At 314, the system may generate a 3D model of the object of interest based at least in part on the one or more frames. For example, the system may utilize one or more machine learned models or networks to generate a 3D model of the exterior as discussed in more detail below.

Figure 4:
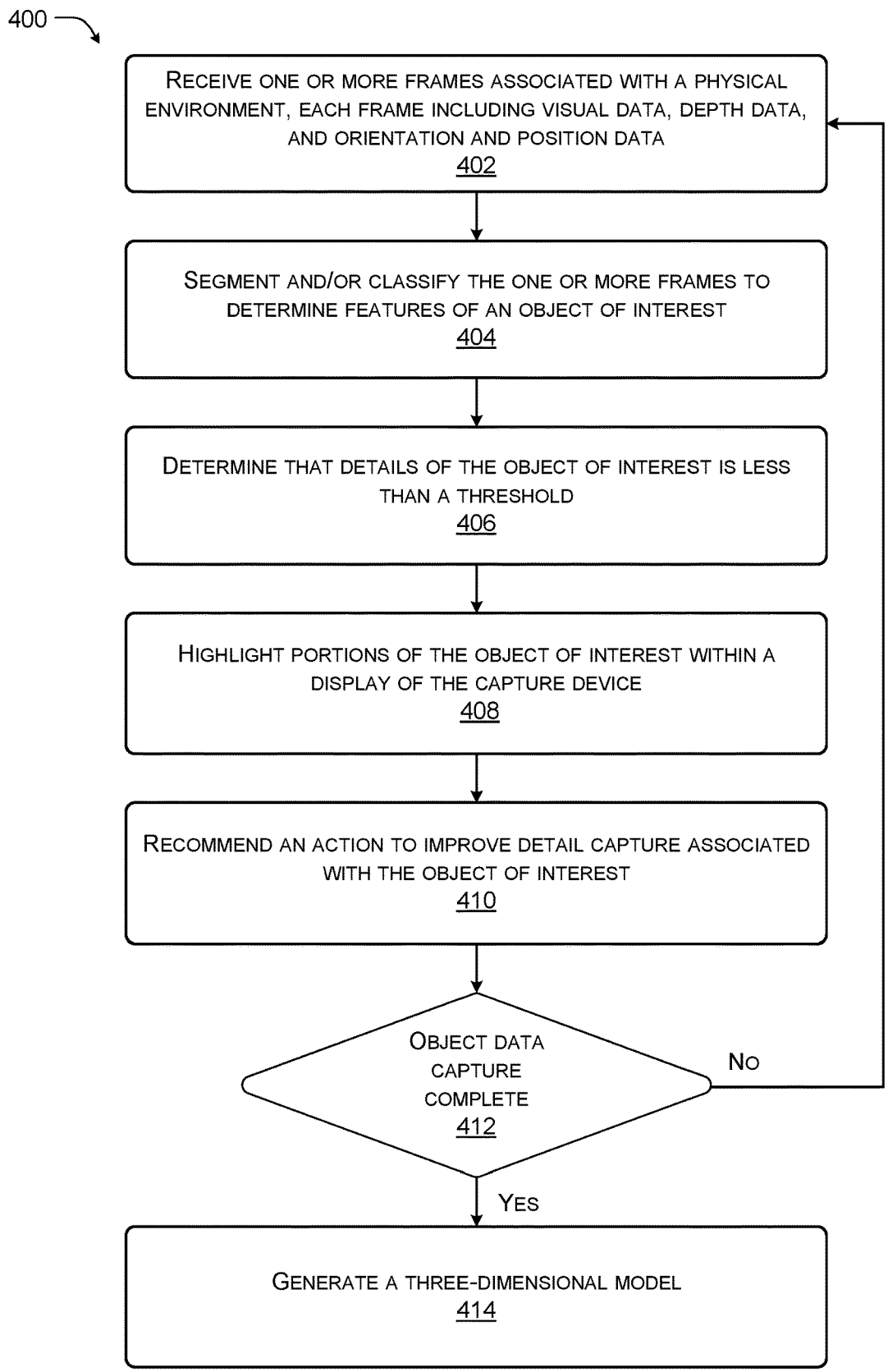
FIG. 4 illustrates an example flow diagram showing a process for capturing sensor data usable to generate a three-dimensional model according to some implementations.

FIG. 4 illustrates an example flow diagram showing a process 400 for capturing sensor data usable to generate a three-dimensional model according to some implementations. In some cases, as the user scans (e.g., generates the sensor data) an object of interest (such as a building), the details of the data being captured during the scan may be less than desired when generating the 3D model. For instance, the user may scan a portion of the object of interest too quickly or leave gaps as the user moves the sensors about.

At 402, the system may receive one or more frames associated with a physical environment. For example, the physical environment may be the exterior environment associated with a building. The one or more frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like).

At 404, the system may segment and/or classify the one or more frames to determine features of an object of interest (such as the exterior of a building). For example, the system may utilize one or more machine learned models and/or networks to segment the image data into features and/or classify the features based on a classification or type (such as window, wall, brick, door, siding, and the like).

At 406, the system may determine that details of the object of interest is less than a threshold. For instance, the details of a feature or portion of the object of interest may have less data than required to segment, classify, and/or generate a 3D model of the feature or portion. For example, the frames may include holes, may have insufficient parallax, insufficient depth data, and the like. In some cases, the system may generate confidence values associated with the frames, features, or object of interest and when the confidence value is less than a confidence threshold, determine that that there is insufficient detail to generate the 3D model.

At 408, the system may highlight (or otherwise visualize) portions of the object of interest within a display of the scanning or capture device. For example, the system may visualize holes to the user by highlighting the holes or showing a black portion of the object of interest on a live video feed or rendering of the object of interest on the display. In some cases, if a particular feature is lacking detail, the system may also highlight or otherwise color the feature within the live video feed or rendering (such as marking the feature as red to indicate the user should return to scanning the particular feature).

At 410, the system may recommend an action to improve the detail capture associated with the object of interest (or a features/portion of the object of interest). For example, the system may identify that the user is too close to the object of interest and suggest the user to move backwards by a determined distance (such as 1, 2, 3, 5, etc. steps). In another example, the system may identify that the right part of the house is not fully visible but there is a substantial portion of the sky visible on the left. Accordingly, the system may suggest the user to move the sensors field of view to the right to increase the amount of the object of interest being captured and reducing the sky (or other background). In yet another example, the system may determine that the top of the building (e.g., the object of interest) hasn't been captured because no sky or other background is visible in the frames. In this example, the system may recommend the user tilt the sensors and/or the field of view of the sensors upward to capture the top of the building.

At 412, the system may determine if the object data capture is complete. For example, the system may determine if the object has no holes greater than a predetermined size (e.g., diameter) or that greater than a predetermined percentage of the object of interest is captured. In some cases, the system may determine that expected features are captured (e.g., front door, garage, at least four sides of the building, roof, and the like) and are present in the frames. If the object data capture is complete, the process 400 may advance to 414. Otherwise, the process 400 may return to 402 to continue to capture frames of the object of interest.

At 414, the system may generate a 3D model of the object of interest based at least in part on the one or more frames. For example, the system may utilize one or more machine learned models or networks to generate a 3D model of the exterior as discussed in more details below.

Figure 5:
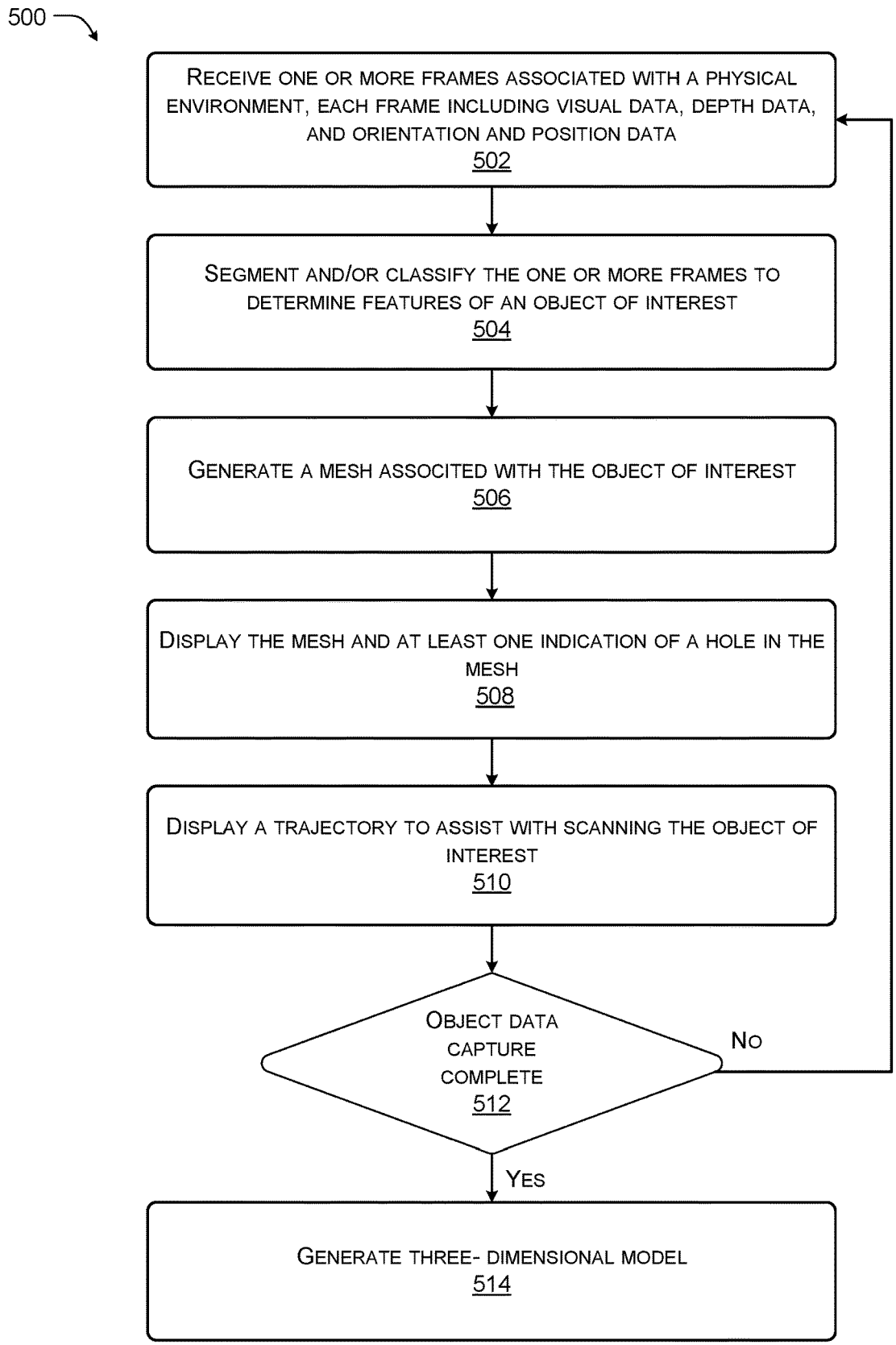
FIG. 5 illustrates an example flow diagram showing a process for capturing sensor data usable to generate a three-dimensional model according to some implementations.

FIG. 5 illustrates an example flow diagram showing a process 500 for capturing sensor data usable to generate a three-dimensional model according to some implementations. In some cases, as the user scans (e.g., generates the sensor data) an object of interest (such as a building), the details of the data being captured during the scan may be less than desired when generating the 3D model or the user may miss portions or generate holes or gaps in the data when scanning the object of interest. For instance, the user may scan a portion of the object of interest too quickly, leaving small gaps within the generated or captured data.

At 502, the system may receive one or more frames associated with a physical environment. For example, the physical environment may be the exterior environment associated with a building. The one or more frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like).

At 504, the system may segment and/or classify the one or more frames to determine features of an object of interest (such as the exterior of a building). For example, the system may utilize one or more machine learned models and/or networks to segment the image data into features and/or classify the features based on a classification or type (such as window, wall, brick, door, siding, and the like).

At 506, the system may generate a mesh associated with the object of interest from the one or more fames and/or the segmented and/or classified data. The mesh may be a rough outline of the object of interest that may be generated in substantially real time as the user scans or captures the frames of the object of interest. In some cases, the mesh may lack details, defined features, and the like.

At 508, the system may display the mesh and at least one indication of a hole in the mesh on the display of the hand-held electronic device. For example, the system may visualize holes to the user by highlighting the holes or showing a black portion of the object of interest within the mesh.

At 510, the system may display a trajectory to assist the user with scanning the object of interest. For example, the system may display a path, direction to move the hand-held device, and/or target on the display. For example, the system may present a position indicator and a target on the display, and the system may instruct the user to align the position indicator with the target. Once the user aligns the position indicator and the target, the system may display a second target and so forth, to assist the user in scanning the object of interest with sufficient accuracy and completeness to generate the 3D model.

In other examples, the system may show a desired trajectory and direction of moment for the user, such as arrows and the like indicating a direction to move the hand-held electronic device. In other examples, the desired or preferred trajectory is may be displayed to the user via a trajectory or guidance shown in a 3D view and/or via a top-down view, for instance, based on aerial or satellite imagery received from a third-party system. For instance, the system may obtain satellite imagery of the physical environment and display the top down view of the environment associated with the satellite imagery and indicate a position or trajectory for the user to move through the environment. In some cases, via the top down view, the system may display an indication of the user's current position and the desired trajectory or next target position. In this manner, the system may suggest scanning paths as well desired scanning positions to the user.

In some examples, the system may have data or information (such as third-party data) of the object of interest and/or the physical environment. For example, the system may have data on the object of interest (e.g., the building), such as height, square footage, number of floors, size of the yard or surrounding environment, age of the building, materials used in construction, walkable paths, and the like. In some case, the system may utilize the data or information to assist in generating the desired trajectory or scanning positions. In some cases, the system may utilize data generated from captured frames together with the third-party data to update or generate the desired trajectories in substantially real time as the user is in the process of scanning the object of interest. For example, the system may use the user's location to determine an identifier for the building (such as an address), locate or otherwise obtain third-party aerial or satellite imagery of the building. The system may then segment and/or classify the third-party aerial or satellite imagery and use the segmented and/or classified third-party aerial or satellite imagery to generate a trajectory. The system may then present the trajectory to the user such as via artificial reality (AR), virtual reality (VR), mixed realty, and/or as a top down view.

In some cases, the system may cause the hand-held device to automatically capture video data based on meeting or exceeding certain criteria, such as time passed (e.g. each 3 seconds), distance travelled, angle changed, substantial content changed in the view, feedback from optical flow, keyframe detection by simultaneous location and mapping (SLAM) techniques, keyframe detection by video codec, user slowed down, user stopped, and the like. In other cases, the system may request that the user to take a still image based on the criteria described above.

At 512, the system may determine if the object data capture is complete. For example, the system may determine if the object has no holes greater than a predetermined size (e.g., diameter) or that greater than a predetermined percentage of the object of interest is captured. In some cases, the system may determine that expected features are captured (e.g., front door, garage, at least four sides of the building, roof, and the like) and are present in the frames.

The system may identify certain objects and decide that even an incomplete capture of such objects can be sufficient for further processing and CAD extraction. For example, the system may identify a window and if 3 corners of the window have been captured, the system may say that it's enough for capturing this area and optionally suggest the user to continue scanning other areas. If the object data capture is complete, the process 500 may advance to 514. Otherwise, the process 500 may return to 502 to continue to capture frames of the object of interest.

In some cases, the system may determine a scan is complete based on data known about exterior environments and, if the scan is not complete, provide feedback specific for exteriors environments prior to returning to 502. For example, the system may recognize features or details that are missing from the data represented by the one or more frames. As a specific example, the system may determine less than a threshold amount of data is representing a roof of a building and as feedback display the text "the roof is not well visible in this view, please step back". As another example, the system may determine the front door or porch is missing from the segmented and/or classified data and display text such as "the porch wasn't captured completely, please finish scanning the porch". In some cases, the system may determine a feature is scanned but the scan is not complete and present text such as "the front side has been captured, please proceed to the left corner" or the like. In some cases, the text or instructions generated by the system may be based on location and orientation data of the user, the physical environment, and/or the object of interest. For example, the system may output the text "please capture the southeast corner of the house", "the northern wall has been fully captured, please continue to the west wall" and the like.

At 514, the system may generate a 3D model of the object of interest based at least in part on the one or more frames. For example, the system may utilize one or more machine learned models or networks to generate a 3D model of the exterior as discussed in more details below.

Figure 6:
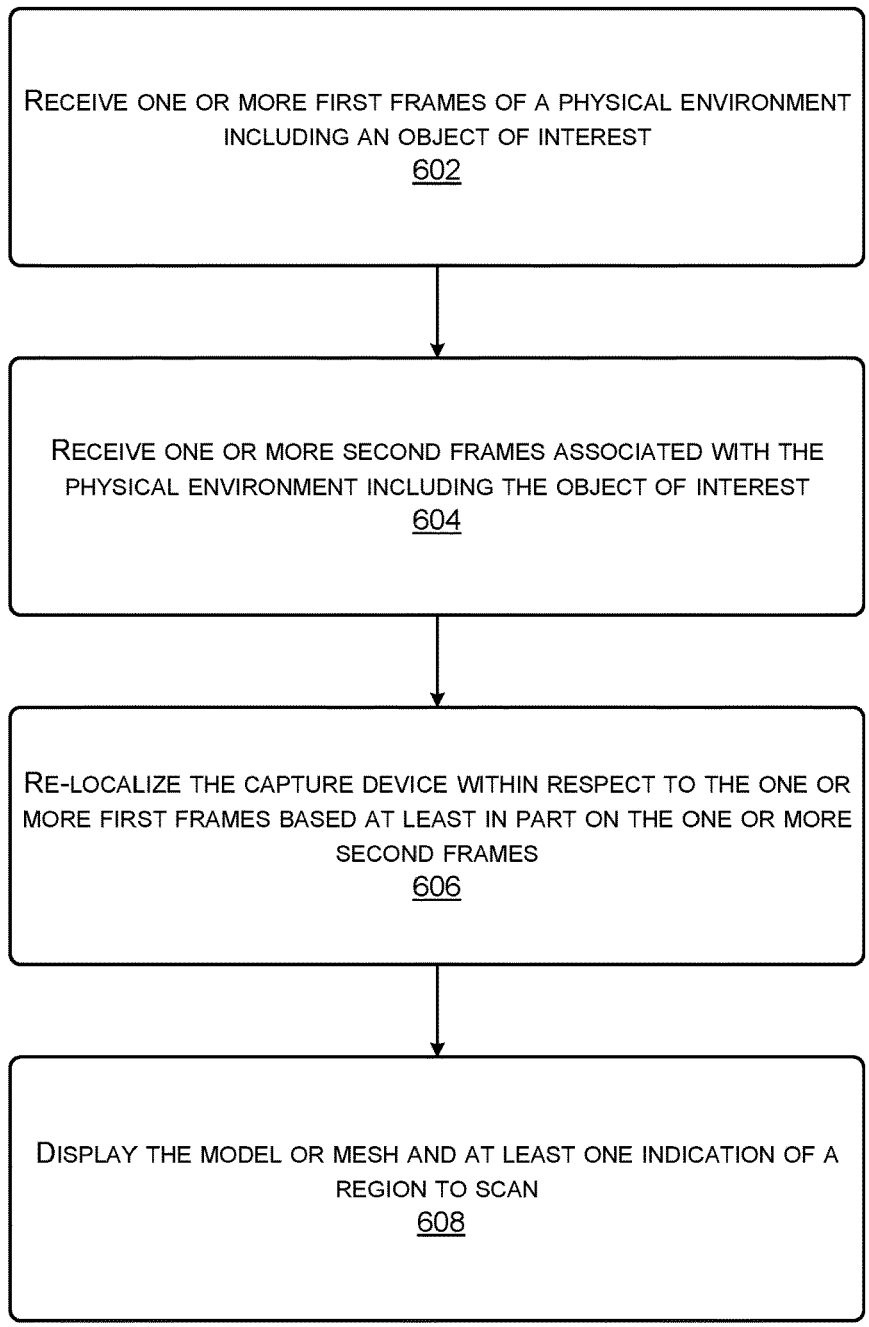
FIG. 6 illustrates an example flow diagram showing a process for generating a three-dimensional model according to some implementations.

FIG. 6 illustrates an example flow diagram showing a process 600 for generating a three-dimensional model according to some implementations. In some examples, an object of interest may require more than one scanning session to capture sufficient image data to generate the 3D model or data from multiple image capture devices may be utilized to generate the 3D model (e.g., an aerial vehicle together with a hand-held device). In these examples, the system may combine the data from prior scan to assist with capturing subsequent scans.

At 602, the system may receive one or more first frames of a physical environment including an object of interest (e.g., a building). The one or more first frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like). In some cases, the one or more first frames may be provided in the form of a partial mesh or model of the object of interest generated from the one or more first frames, segmented and/or classified data associated with the object of interest and generated from the one or more first frames, or the like.

At 604, the system may receive one or more second frames of a physical environment including an object of interest. Similar to the first frames, the one or more second frames may include various types of sensor data, such as visual data, depth data, and/or orientation and position data. In this example, the one or more first frames may be captured at a time prior to the one or more second frames, the one or more first frames may be generated by a different sensor system or capture device than the one or more second frames, or the like. For instance, the user may initiate a scanning process of the object of interest at a first time but was unable to complete the scan as a period of time associated with the scan may have expired. In this instance, the user may return to the object of interest or the physical environment and initiate a second scan to generate the one or more second frames in order to complete the data capture of the object of interest.

At 606, the system may re-localize the capture device with respect of the one or more first frames based at least in part on the one or more second frames. For example, the system may utilize a SLAM application operation on the hand-held device, the location and/or position data or GPS data of the first frames, second frames, and/or device, as well as one or more keyframes associated with the first frame and/or second frames to localize the user with respect to the first or prior capture frames.

As one example, the system may request the user to provide exact or approximate alignment between frame or features of the first frames and frames of the second frames (e.g., the user may utilize an interface to align features of one or more of the first frames with corresponding features represented in the one or more second frames). As a specific example, the user may align two images of a door, window, corner, or other feature within frames of the first frames and the second frames to assist with re-localization. In some cases, the alignment may be performed in 2D, 3D, via a top down view, dollhouse view or the like.

In other examples, the system may provide the alignment by having the user generate data from a desired position. In this example, the system may segment and classify the newly captured images and align them based on pattern matching and classifications of features generated with respect to the first frames.

In one example, the system may utilize assumptions to improve the speed or total time for alignment between the first frames and the second frames. For instance, the system may assume the features from a shape and the first frames, and second frames are associated with the exterior of the shape. In other cases, the system may assume that the initial frames of the second frames (e.g., the first captured frames of the second frames) are proximate to the latter frames of the first frames (e.g., the last frames of the first frames). In these case, the system may assume the user resumes scanning at a position proximate to where the user ended the prior scanning session.

At 608, the system may display a model or mesh and at least one indication of a region to scan. For example, one the user or capture device is re-located with respect to the existing frames (e.g., the first frames), the system may display a region or other indication of an area at which the user should resume scanning the object of interest. For instance, as discussed above, the system may display a trajectory, scanning position, one or more targets, or the like. For example, the system may display a preferred trajectory or direction of movement for the device via guidance in augmented reality showing the trajectory/direction of movement and the mesh/model with respect to the second frames received from the sensor in substantially real time.

In the above example of process 600, two scanning sessions are discussed. However, it should be understood that the data to generate the 3D model may be captured in any number of scanning sessions, each of which may be utilized to generate the 3D model as discussed herein.

Figure 7:
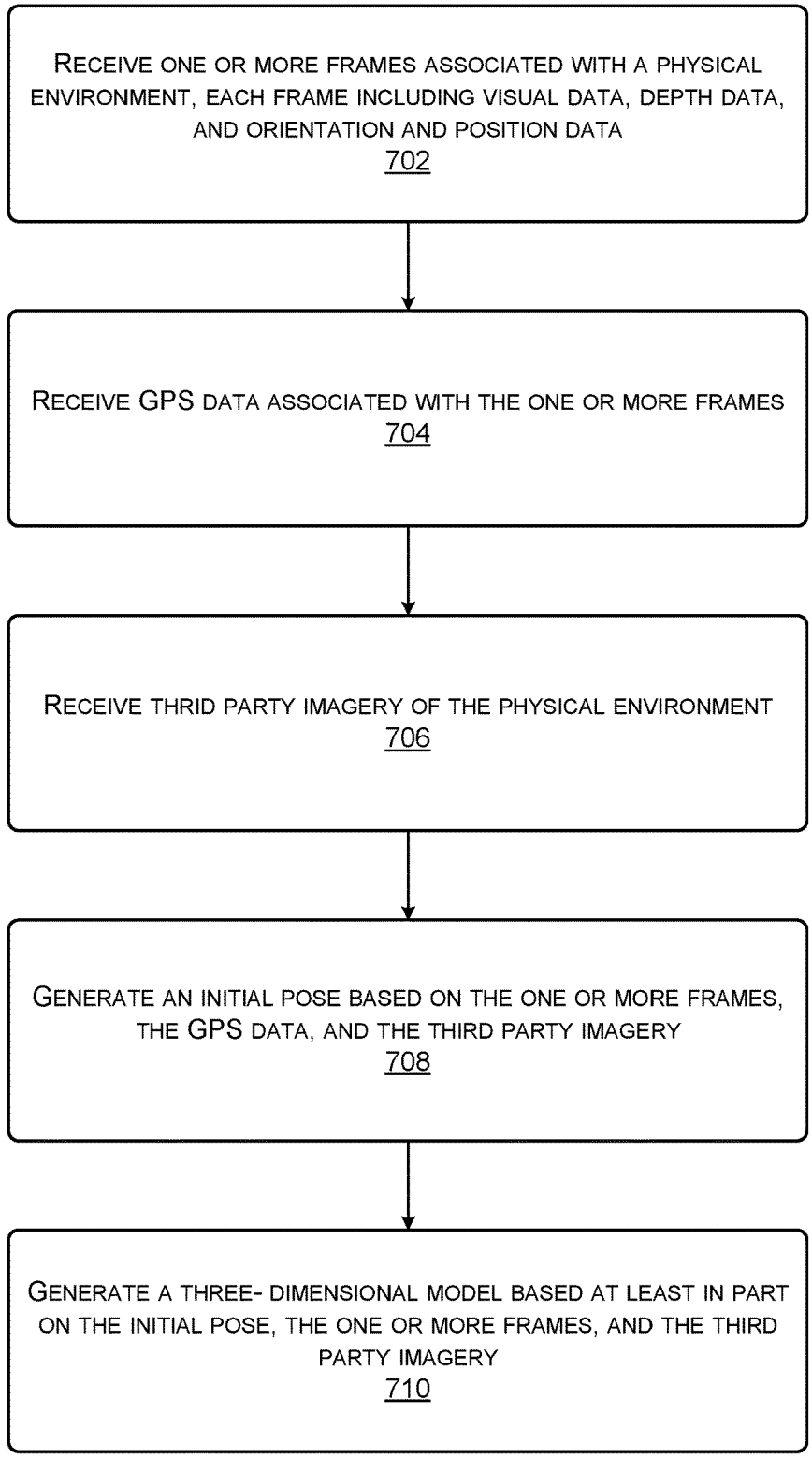
FIG. 7 illustrates an example flow diagram showing a process for generating a three-dimensional model according to some implementations.

FIG. 7 illustrates an example flow diagram showing a process 700 for generating a three-dimensional model according to some implementations. As discussed above, in some cases, the system may utilize third-party data and/or imagery of the object of interest to assist with generating 3D models. For example, some portions of exterior structures, such as roofs of buildings, may be hard to scan from terrestrial (ground based) positions via hand-held electronic devices. In these cases, the system may unitize third-party data and imagery to augment the data generated from the hand-held device and complete the 3D model.

At 702, the system may the system may receive one or more frames associated with a physical environment. For example, the physical environment may be the exterior environment associated with a building. The one or more frames may include various types of sensor data, such as visual data (e.g., still image data and/or video data), depth data (such as from a depth sensor), and/or orientation and position data (such as internal measuring unit (IMU) data, acceleration data, gravity data, motion data, location data, angular data, momentum data, and the like). In this example, the one or more frames may be captured by a hand-held electronic device or other sensor.

At 704, the system may receive GPS data associated with the one or more frames. In this example, the system may utilize the GPS data to determine an identifier (such as an address) associated with the physical environment. The system may then access or request from a third-party system third-party data (e.g., imagery) of the physical environment.

At 706, the system may receive the third-party imagery of the physical environment. For example, the third-party imagery may include aerial or satellite imagery provided via one or more publicly available cloud-based service (such as a map service or other satellite based service).

At 708, the system may generate an initial pose based on the one or more frames, the GPS data, and the third-party imagery. For example, the system may determine an initial pose of the object of interest using the one or more frames, the GPS data, and the third-party imagery as well as one or more known assumptions associated with the object of interest (such as basic geometry of buildings and the like). In one examples, the system may generate an initial pose using position data (e.g., the GPS data) and then refine the pose using the frames and/or imagery.

At 710, the system may generate a 3D model based at least in part on the initial pose, the one or more frames, and the third-party imagery. For example, the system may utilize the satellite or mapping images of the physical environment/ object of interest to complete a top surface of the model and the one or more frames to complete the side surfaces of the model. In some cases, the initial pose may be utilized to assist in aligning the third-party data with the one or more frames.

Figure 8:
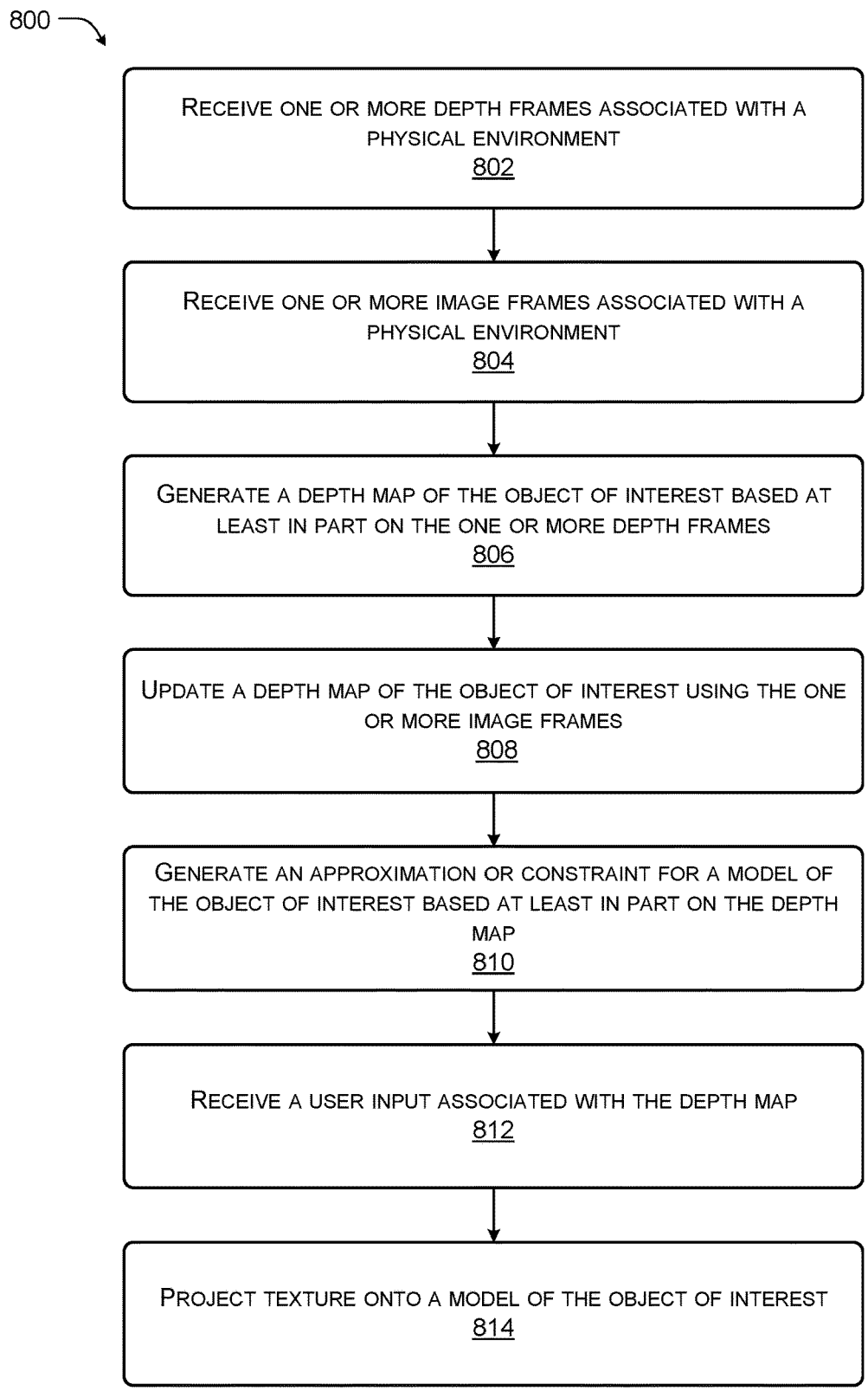
FIG. 8 illustrates an example flow diagram showing a process for generating a three-dimensional model according to some implementations.

FIG. 8 illustrates an example flow diagram showing a process 800 for generating a three-dimensional model according to some implementations. In some cases, the 3D model may include colors, textures, and/or surfaces that may be rendered in a realistic manner such as for use by remote exterior designers, landscape architects, or the like. In these examples, the system may utilize colors, textures, and/or surfaces extracted from the data captured of the object of interest and stored data associated various types of martials, finishes, and surfaces to project color, texture, and surface onto the 3D model in a realistic manner.

At 802, the system may receive one or more depth frames associated with a physical environment. For example, the depth frames may include one or more (such as a per pixel) distances between the capture device and the object of interest or an object obstructing the field of view of the capture device.

At 804, the system may receive one or more image frames associated with the physical environment. In some cases, the image frames may be received substantially concurrently with the one or more depth frames (such as a device equipped with an image capture sensor and a depth capture sensor).

At 806, the system may generate a depth map of the object of interest based at least in part on the one or more depth frames. For example, the depth map may include a per pixel depth. In some cases, the depth map may remove data determined to be associated with an obstruction (such as a tree, bush, automobile, or the like) that was blocking the field of view of the object of interest.

At 808, the system may update the depth map of the object of interest using one or more image frames. For example, the system may extract surfaces or smooth the depth map based on features extracted from the one or more image frames. As an example, a bush may obstruct part of a wall of a building (e.g., the object of interest). In this example, the system may determine a smooth surface (e.g., the wall) extends behind the bush based on an analysis of the image data and, accordingly, extend the surface of the wall within the depth map.

At 810, the system may generate an approximation or constraint for a model (e.g., a 3D model) of the object of interest based at least in part on the depth map. For example, if the object is a two-story home, the system may generate depth data for the first floor and for the lower half of the second floor (e.g., from the user scan), but the depth data may have one or more gaps for the upper half of the second floor. In this example, the system may reconstruct the upper half of the second floor from imagery using photogrammetry. The system may utilize the constraint to assist with the photogrammetry reconstruction, such as that the upper part of the second floor should be seamlessly continued from the lower part of the second floor based at least in part on the depth data. Thus, the system may maintain the bottom part of the second floor when generating the upper part of the second floor.

At 812, the system may receive a user input associated with the depth map. In this example, the user input may be associated with an area to apply or project a specific texture. For example, a user interface may allow the user to click (or make a brush stroke, other selection, drag and drop action, or the like) on a region of the scanned data (e.g., the one or more frames). The system may then extract or generate a corresponding texture based at least in part on the image data associated with the selected region (such as described below with respect to 814). The system may then allow the user to provide a second user input associated with the model and the system may project the texture onto the selected portion of the model. As another example, the user may first select a portion of the model and then select a region of the scanned data.

In some implementations, the interface may allow the user to select multiple features on the scanned data to generate the synthetic texture. The user may also select multiple features on the model to apply the texture to multiple areas or regions. For example, the user may select multiple windows on the model so that all of the windows have the same texture.

In this example, at 812, a user input is discussed. However, it should be understood that in some implementations the user input may be optional or skipped. In these cases, the process 800 may proceed from 810 to 814 and generate the textures in an automated manner.

At 814, the system may project texture onto the object of interest. For example, the system may extract and project textures (such as brick, stucco, wood, or the like) from the video or static frames onto the model. In some cases, the system may perform segmentation and/or classification on the textures of the image data (e.g., the frames).

The system may also warp textures geometrically and modify photometrically to improve the visual quality and consistency of the texture over portion of the model. In some cases, the system may extend the texture along the surfaces that were obstructed during scanning in a manner similar to extending the depth map, as discussed above.

In some examples, the system may have a database of textures and search this database for textures, which are similar to the natural textures extracted from the image data. For example, the system may extract a red brick texture from the one or more frames and utilize the database of textures to generate the red brick texture projected onto the model. In some cases, the source image data or textures may be segmented into different texture classes to assist with selecting an appropriate or corresponding texture for the model. For example, each of the textures in the database may include one or more classes and the image data of the corresponding feature may be extracted and classified, for instance, via one or more machine learned models or networks, to assign one or more texture classes. The system may then select the closest (e.g., the stored texture with the most matching or corresponding classes) to project as a texture on the model.

In some implementations, the system may synthesize textures based on the natural textures. For example, the system may use manual, semi-automatic or automatic segmentation as described above. Segmentation and texture synthesis can be combined, (e.g. the system may use segmentation information, such as segmented area or seeds placed by the user) not only to perform segmentation but as a source for the synthetic texture. The system may assign and/or generate the textures based on machine learning or other techniques, which uses the shape and/or appearance (and/or location) of the feature to generate a suitable texture. For example, the system may know that homes in a particular location or region (such as the southwest) usually have red roof tiles and select an appropriate texture based on the location data and the features extracted from the one or more frames. As another example, the system may know that homes with certain geometry (e.g., size of roofs, facades, or other objects) usually correspond to the use of a certain material. The system may utilize the geometry and the known materials to generate the texture for the corresponding portion of the model.

Figure 9:
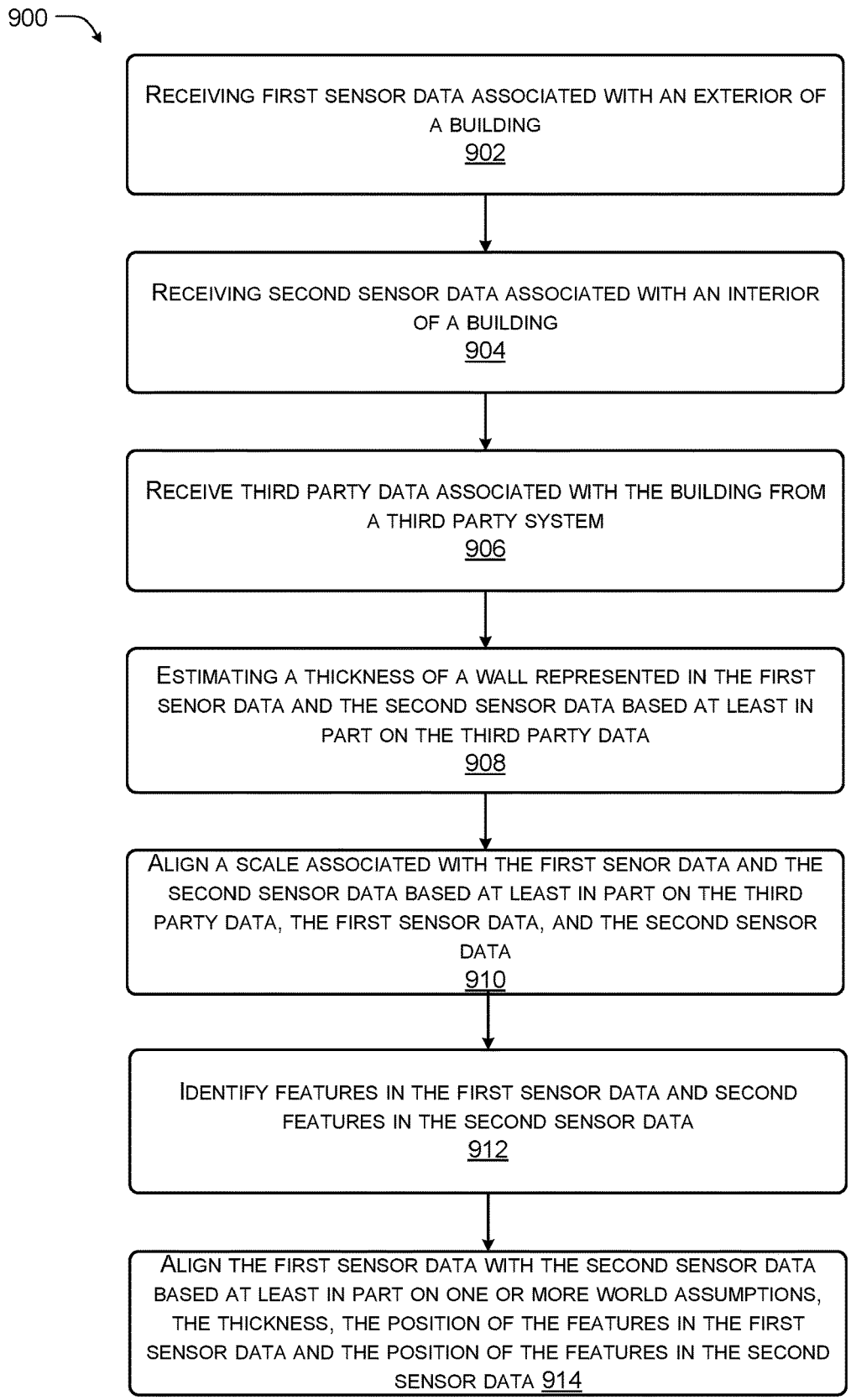
FIG. 9 illustrates an example flow diagram showing a process for generating a three-dimensional model according to some implementations.

FIG. 9 illustrates an example flow diagram showing a process 900 for generating a three-dimensional model according to some implementations. As discussed above, in some cases, the system may receive sensor data (e.g., image, depth, or the like) of the object of interest in multiple scanning sessions. In some examples, a first scanning session may include data associated with an exterior of the object of interest (or building) and a second scanning session may include data associated with an interior of the object of interest (or building). In these examples, the system may align the exterior and interior into a single model.

At 902, the system may receive first sensor data associated with an exterior of a building (e.g., the object of interest). In some cases, the first sensor data may include one or more frames or other visual data (e.g., still image data and/or video data), depth data, orientation and position data (such as internal measuring unit (IMU) data, acceleration data, gravity data, motion data, location data, angular data, momentum data, and the like), GPS data, and the like.

At 904, the system may receive second sensor data associated with an interior of the building (e.g., the object of interest). Similar to the first sensor data, the second sensor data may also include one or more frames or other visual data, depth data, orientation and position data, GPS data, and the like.

At 906, the system may receive third-party data associated with the building from a third-party system, for example, the third-party data may include building codes, architectural standards, material lists, and the like.

At 908, the system may estimate a thickness of a wall represented in the first sensor data and the second sensor data based at least in part on the third-party data. For example, the system may determine a thickness of an exterior wall represented in both the first sensor data of the exterior of the building and the second sensor data of the interior of the building. In some cases, the wall thickness may be determined based on an estimated materials associated with the wall and the third-party data (such as the bundling code with a minimal wall thickness or the like).

At 910, the system may align a scale associated with the first sensor data and the second sensor data based at least in part on the third-party data, the first sensor data, and the second sensor data. For example, if the standard step height is known from the building codes or architectural standards the system may determine a scale for the first sensor data and a second scale for the second sensor data, for instance, based on a visible step. In other examples, standard lighting fixtures, sock sizes, electric box sizes, door frame sizes, and the like may be used to determine the scales.

At 912, the system may identify first features in the first sensor data and in the second sensor data. In other words, the system may identify a features visible in both the first sensor data and the second sensor data, such as a window, door, wall segment, or the like. In some cases, the system may identify some features such as peculiar visual or geometric features including points, lines, blurbs, and use them for alignment, in particular, by matching them based on their appearance, structure, and/or location.

At 914, the system may align the first sensor data with the second sensor data based at least in part on one or more world assumptions, the thickness, the position of the features in the first sensor data and the position of the features in the second sensor data. For example, the system may space or gap the exterior sensor data and the interior sensor data based on the thickness of the wall and otherwise align using the positions of the features in both the first sensor data and the second sensor data.

In some cases, the alignment may use Manhattan world assumptions, such as parallel, perpendicular, horizontal, vertical planes and lines to assist with alignment of the features and, thereby, the models, scenes, and/or objects. In some cases, the system may use the presence or absence of data, such as holes in the 3D model, to assist with alignment of the first sensor data and the second sensor data.

Figure 10:
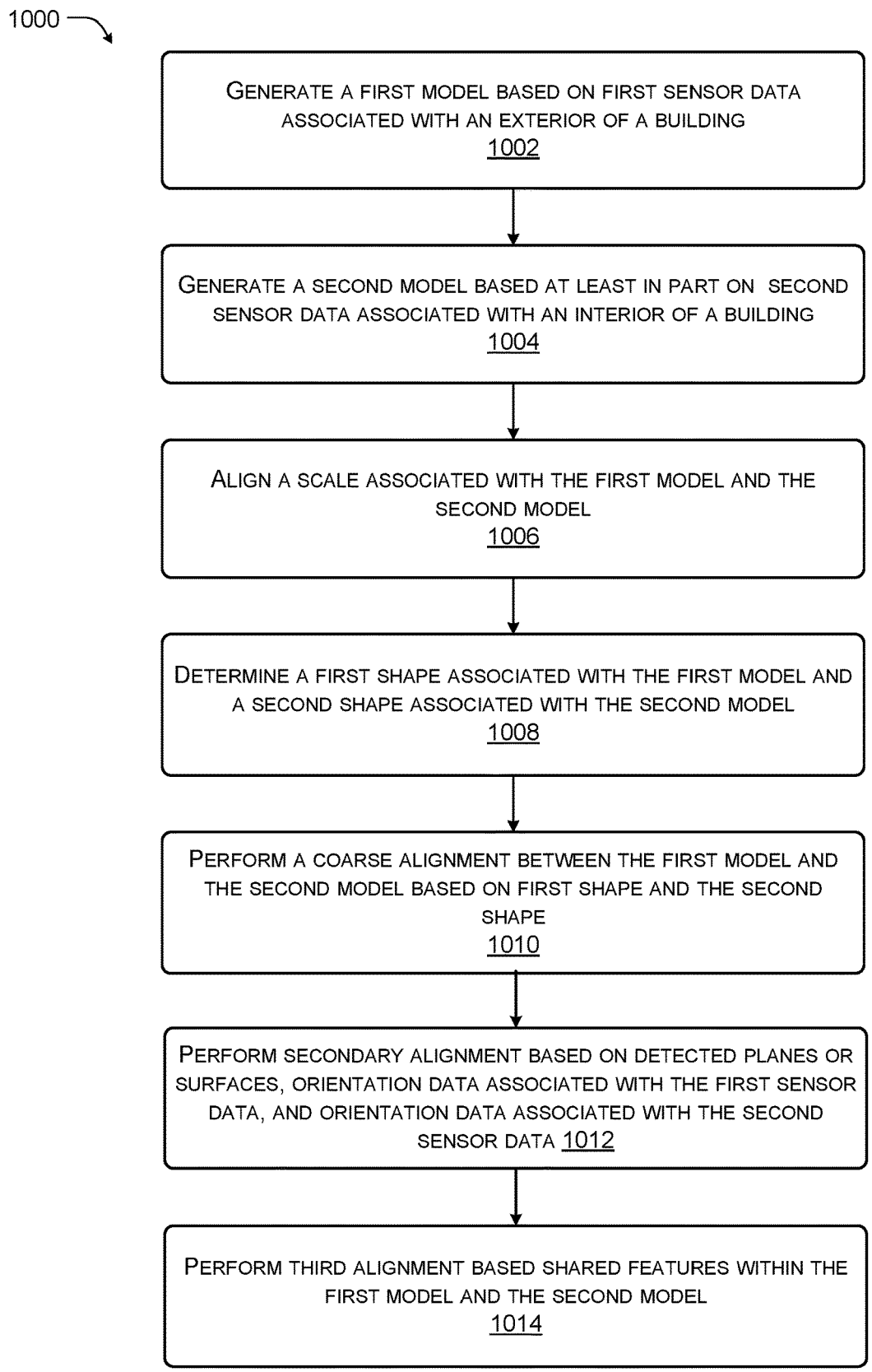
FIG. 10 illustrates an example flow diagram showing a process for aligning three-dimensional models according to some implementations.

FIG. 10 illustrates an example flow diagram showing a process 1000 for aligning three-dimensional models according to some implementations. In some examples, the system may align models of the exterior with model of the interior of the same building (e.g., object of interest) to complete an immersive environment including the interior and exterior of a physical location.

At 1002, the system may generate a first model based on first sensor data associated with an exterior of a building. For example, the model may be generated as discussed above with respect to FIGS. 1-8.

At 1004, the system may generate a second model based at least in part on second sensor data associated with an interior of a building. Again, the model may be generated as discussed above with respect to FIGS. 1-8. In some cases, the first and the second models may be generated and received by the system.

At 1006, the system may align a scale associated with the first model and the second model based. For example, the system may determine a scale of each model based on third-party data (e.g., the building codes or architectural standards) associated with a physical region, as discussed above. For example, the system may utilize a standard step height, lighting fixtures, sock sizes, electric box sizes, door frame sizes, and the like visible in the first model and/or the second model to determine a corresponding scale for each model.

At 1008, the system may determine a first shape associated with the first model and a second shape associated with the second model. For example, the system may determine a center, one or more bounding boxes, elongation direction, and the like for each model.

At 1010, the system may perform a coarse alignment between the first model and the second model based on first shape and the second shape. For example, the system may adjust each model (e.g., move/rotate/scale) to align the two models along the first shape and second shape based in part on proximity of geometry of the first shape and the second shape. In some cases, the system may evenly distribute gaps between the first shape and the second shape.

At 1012, the system may perform secondary alignment based on detected planes or surfaces, position and orientation data associated with the first sensor data, and orientation data associated with the second sensor data. In some examples, the system may first align using a global or shared orientation data between the first model and the second model, such as compass or GPS data, gravity vector, or the like. In some cases, the global orientation data may be used for alignment, in particular, as a constraint or as a first approximation for alignment. In some cases, the GPS or location data may be used together with third-party imagery, such as satellite images, to assist with alignment as well as orientation and placement of the building on the surrounding plot of land. In this manner, the first shape and/or second shape may be aligned with a top-down shape or outline of the building within the third-party data.

In some examples, the system may align using normals of surfaces from the first model and the second model, such as clustering the surfaces and/or voting for the major directions of alignment. For example, the system may for each polygon in each model determine a normal. The system may then determine a distribution of such normals for each model. Using the distribution, the system may find such parameters of rotation of one model with respect to another model, such that the distribution of normals in one models match the distribution of normals in the another model. As another example, the system may utilize the polygons in each model as a vote for each of the three major perpendicular directions, e.g. the up-vector and two-vectors along major perpendicular walls. The system may then rotate each of the two models in such a way so that the axes of the models match the axes of the vote.

At 1014, the system may perform a third alignment based shared features within the first model and the second model. For example, the system may align based on a shared window detected in both the first model and the second model. In some cases, the system may also utilize the shared features to improve segmentation and/or classification of the features. For instance, in the window example, the window may be detected on both the interior model and the exterior model. The combination of such information may be used to improve confidence of detection and reduce the number of false positives during segmentation.

In some implementations, data and information known about the exterior model may be used to improve the quality of reconstruction of the interior model, and vice versa. For example, if an interior space contains a mirror, resulting in the interior 3D model "protruding" outside of the space boundaries, the exterior model may be used to detect and fix such protrusion, as the protrusion is not physically possible (e.g., the interior is not larger than the exterior).

Figure 11:
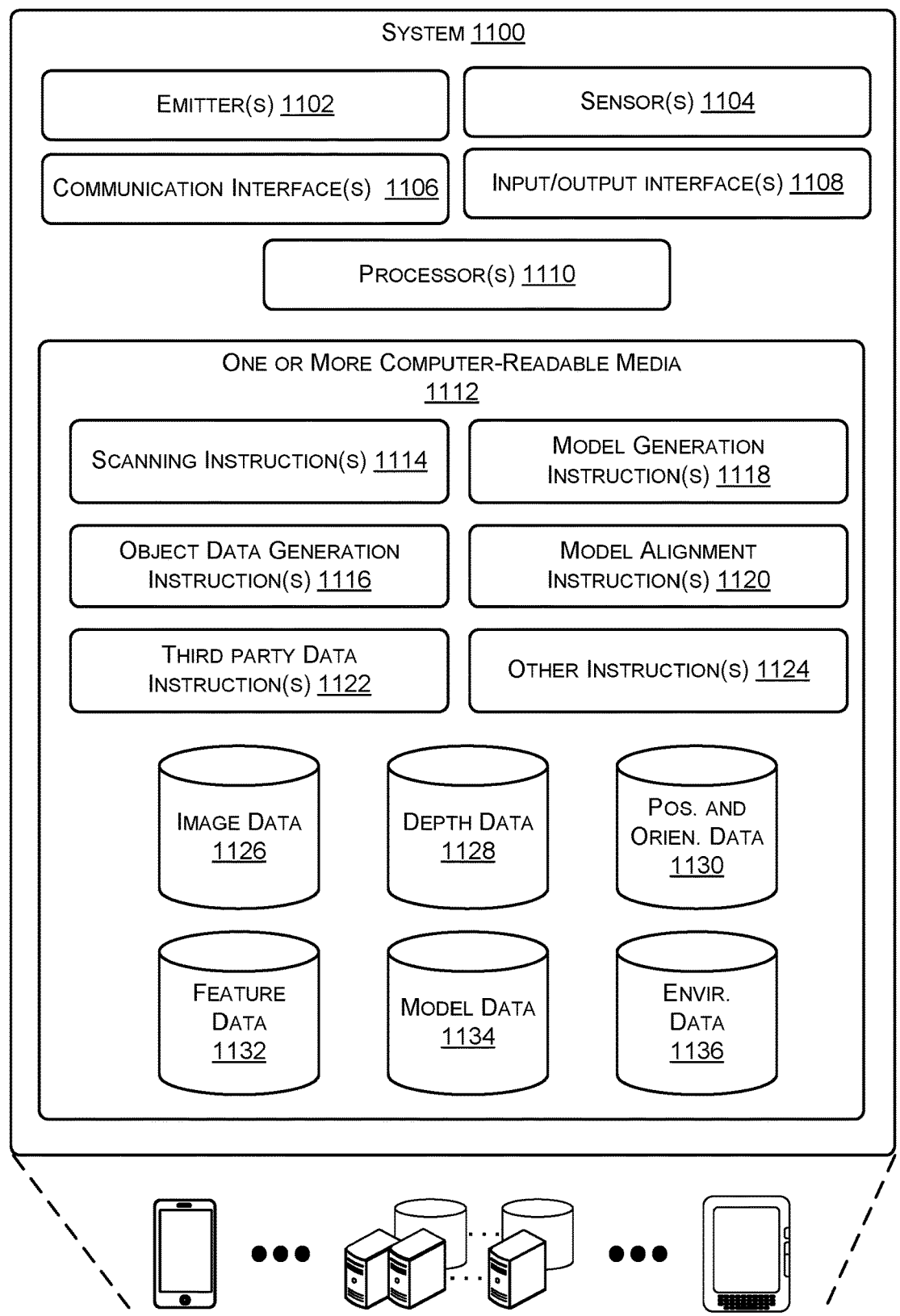
FIG. 11 is an example system for generating three-dimensional models according to some implementations.

FIG. 11 is an example system 1100 for generating three-dimensional models according to some implementations. In some cases, the system 1100 may be a hand-held electronic device equipped with sensors and one or more application for generation and/or aligning 3D models. In other examples, the system 1100 may be a cloud-based service to assist with generating and/or aligning 3D models. In still other examples, the system 1100 may be implemented as a hand-held device in communication with a cloud-based service, such that some of the components and instructions may be stored locally on the hand-held device and other component and/or instructions may be associated with a remote cloud-based service.

In some examples, the system 1100 may include one or more emitters 1102. The emitters 1102 may be mounted on an exterior surface of the device 1100 in order to output illumination or light into a physical environment. The emitters 1102 may include, but are not limited to, visible lights emitters, infrared emitters, ultraviolet light emitters, LIDAR systems, and the like. In some cases, the emitters 1102 may output light in predetermined patterns, varying wavelengths, or at various time intervals (e.g., such as pulsed light).

The system 1100 may also include one or more sensors 1104. The sensor 1104 may include image sensors, depth sensors, motion sensors, position sensors, and the like. For example, the sensors 1104 may include image devices, spectral sensors, IMUs, accelerometers, gyroscopes, depth sensors, infrared sensors, GPS systems, and the like.

The system 1100 may also include one or more communication interfaces 1106 configured to facilitate communication between one or more networks, one or more cloud-based system(s), and/or one or more mobile or user devices. In some cases, the communication interfaces 1106 may be configured to send and receive sensor data, model data, object data, or the like to one or more cloud-based service as discussed above. The communications interfaces(s) 1106 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In the illustrated example, the system 1100 also includes an input and/or output interface 1108, such as a projector, a virtual environment display, a traditional 2D display, buttons, knobs, and/or other input/output interfaces. For instance, in one example, the interfaces 1108 may include a flat display surface, such as a touch screen configured to allow a user of the system 1100 to consume content (such as scanning instructions, 3D models, and the like).

The system 1100 may also include one or more processors 1110, such as at least one or more access components, control logic circuits, central processing units, or processors, as well as one or more computer-readable media 1112 to perform the function associated with the virtual environment. Additionally, each of the processors 1110 may itself comprise one or more processors or processing cores.

Depending on the configuration, the computer-readable media 1112 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1110.

Several modules such as instructions, data stores, and so forth may be stored within the computer-readable media 1112 and configured to execute on the processors 1110. For example, as illustrated, the computer-readable media 1112 may scanning instructions 1114, object data generation instructions 1116, model generating instructions 1118, modeling alignment instructions 1120, third-party data instructions 1122 as well as other instructions 1124. The computer-readable media 1112 may also store data such as image data 1126, depth data 1128, position and orientation data 1130, feature or object data 1132 (segmented and/or classified data), model data 1134 (e.g., 3D models), and environment data 1136 (such as an address or other identifier).

The scanning instructions 1114 may be configured to cause the emitters 1102 and the sensors 1104 to scan or otherwise capture image data 1126, depth data 1128, and/or position and orientation data 1130 of a physical environment.

The object data generation instructions 1116 may be configured to process the image data 1126, the depth data 1128, and/or the position and orientation data 1130 as well as, in some cases, the third-party data (such as satellite imagery) of an object of interest (e.g., an exterior of a building) to generate the feature data 1132 associated with various features of the object of interest. In some cases, the object data generation instructions may utilize one or more machine learned models or networks to generate the feature data 1132.

The model generating instructions 1118 may be configured to generate 3D models of an object of interest based at least in part on the image data 1126, the depth data 1128, the position and orientation data 1130, and/or the feature data 1132, as discussed herein.

The modeling alignment instructions 1120 may be configured to utilize the feature data 1132 and/or the model data 1134 as well as third-party data (such as building standards, architectural codes, and the like, to align multiple models, such as the exterior and interior of a building.

The third-party data instructions 1122 may be configured to obtain third-party data, such as imagery, building and/or architectural codes, and the like associated with a physical environment. For example, the third-party data instructions 1122 may obtain the third-party data based on an address or other identifier associated with the physical environment, as discussed herein.

Example Clauses

A. A method comprising: receiving first sensor data associated with an exterior physical environment, the first sensor data including first image data of the exterior physical environment; detecting, based at least in part on the image data, a region associated with the object of interest, the region including at least one of: a gap or hole in the image data; an obstruction of the object of interest; or an area of detail less than a detail threshold; and presenting on a display a representation of the image data, the representation indicating the region; receiving second sensor data associated with the exterior physical environment, the second sensor data including second image data of the exterior physical environment; and generating, based at least in part on the first image data and the second image data, a three-dimensional model associated with the exterior physical environment.

B. The method as recited in claim A, further comprising: determining a circumstance associated with the capture of the first sensor data; and presenting on a display a recommended capture technique or sensor setting.

C. The method as recited in claim A, further comprising: determining, based at least in part on the sensor data, an identifier associated with the exterior physical environment; receiving, based at least in part on the identifier, third-party data associated with the exterior physical environment; and wherein generating the three-dimensional model is based at least in part on the third-party data.

D. The method as recited in claim A, further comprising presenting on a display the three-dimensional model.

E. The method as recited in claim A, further comprising: presenting on the display at least one of: a trajectory to assist a user in capturing the second sensor data associated with the region; or a target to assist the user in capturing the second sensor data associated with the region.

F. The method as recited in claim A, wherein presenting on a display a representation of the image data further comprises: estimating, based at least in part on the first image data, a geometry of an object associated with the exterior physical environment; generating, based at least in part on geometry, a preliminary three-dimensional model, the preliminary three-dimensional model different than the three-dimensional model; and presenting on the display the preliminary three-dimensional model as the representation of the first image data.

G. The method as recited in claim A, further comprising: receiving an interior model, the interior model associated with an interior of a building associated with the exterior physical environment; segmenting the first image data and the second image data to generate object data associated with the building; and determining, based at least in part on the object data and the interior model, an alignment between the three-dimensional model and the interior model.

H. The method as recited in claim G, wherein determining the alignment between the three-dimensional model and the interior model further comprises: determining a correspondence between a first object of the object data and a second object of the interior model, the correspondence including at least one of: a feature of the first object and the second object; a dimension of the first object and the second object; or a third object adjacent to the first object and the second object.

I. The method as recited in claim A, wherein: the first sensor data is captured at a first time; the second sensor data is capture at a second time, the second time subsequent to the first time; and the method further comprising: prior to generating the three-dimensional model, receiving third sensor data associated with the exterior physical environment, the third sensor data captured at a third time, the third time subsequent to the second time; aligning, based at least in part on the first item and the second time, the first sensor data with the second sensor data; and aligning, based at least in part on the second item and the third time, the second sensor data with the first sensor data.

J. The method as recited in claim A, wherein generating the three-dimensional model associated with the exterior physical environment further comprises: determining, based at least in part on a constraint or a spatial relationship, an alignment between the first sensor data and the second sensor data.

K. One or more non-transitory computer-readable media storing instructions that, when executed, cause one or more processors to perform operations comprising: receiving first sensor data associated with an exterior physical environment, the first sensor data captured using a first capture technique or during a first session; determining, based at least in part on the first sensor data, at least one feature associated with the exterior physical environment; in response to determining the at least one feature, receiving second sensor data associated with the exterior physical environment, the second sensor data captured using a second capture technique or during a second session; and generating, based at least in part on the first sensor data and the second sensor data, a three-dimensional model associated with the exterior physical environment.

L. The one or more non-transitory computer-readable media as recited in claim K, wherein the at least one feature is an anchor associated with localizing the second sensor data.

M. The one or more non-transitory computer-readable media as recited in claim K, wherein the first capture technique is still images and the second capture technique is a continuous capture technique.

N. The one or more non-transitory computer-readable media as recited in claim K, wherein: the first sensor data includes position data or orientation data; and aligning, based at least in part on the position data or the orientation data, the second sensor data with the first senor data.

O. A method comprising: receiving sensor data associated with an exterior physical environment, the sensor data including image data of the exterior physical environment; determining, based at least in part on the sensor data, an identifier associated with the exterior physical environment; receiving, based at least in part on the identifier, third-party data associated with the exterior physical environment; and generating, based at least in part on the image data and the third-party data, a three-dimensional model associated with the exterior physical environment.

P. The method as recited in claim O, wherein the exterior physical environment includes an object of interest and the method further comprises: detecting, based at least in part on the image data, a region associated with the object of interest, the region including at least one of: a gap or hole in the image data; an obstruction of the object of interest; or an area of detail less than a detail threshold; and presenting on a display a representation of the image data, the representation highlighting the region.

Q. The method as recited in claim P, wherein: the sensor data includes position data or orientation data; determining the identifier associated with the exterior physical environment is based at least in part on the position data or the orientation data; and the identifier is an address associated with a building associated with the exterior physical environment.

R. The method as recited in claim P, wherein: the third-party data includes third-party imagery of the exterior physical environment; and generating the three-dimensional model is based at least in part on the third-party imagery.

S. The method as recited in claim P, wherein the three-dimensional model is a first three-dimensional model of a building associated with the exterior physical environment and the method model further comprises: receiving a second three-dimensional model, the second three-dimensional model associated with an interior of the building; and generating, based at least in part on the first three-dimensional model and the second three-dimensional model, a joint model of the building.

T. The method as recited in claim S, wherein: the third-party data includes a wall thickness associated with the building; and generating the joint model comprises aligning, based at least in part on the wall thickness, the first three-dimensional model and the second three-dimensional model.

While the example clauses described above are described with respect to one particular implementation, it should be understood that, in the context of this document, the content of the example clauses can also be implemented via a method, device, system, a computer-readable medium, and/or another implementation. Additionally, any of the examples A-T may be implemented alone or in combination with any other one or more of the examples A-T.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
   receiving first sensor data associated with an exterior physical environment, the first sensor data including first image data of the exterior physical environment;
   detecting, based at least in part on the image data, a region associated with the object of interest, the region including an area of detail less than a detail threshold; and
   presenting on a display a representation of the image data, the representation including an indication that additional sensor data of the region should be captured;
   receiving second sensor data associated with the exterior physical environment, the second sensor data including second image data of the exterior physical environment; and
   generating, based at least in part on the first image data and the second image data, a three-dimensional model associated with the exterior physical environment;
   receiving an interior model of an interior of the exterior physical environment, the interior model associated with an interior of a building associated with the exterior physical environment, the interior model generated from additional image data that is nonoverlapping and differs from the first image data and the second image data;
   segmenting the first image data and the second image data to generate object data associated with the building; and
   determining, based at least in part on the object data and the interior model, an alignment between the three-dimensional model of the exterior physical environment and the interior model of the interior of the exterior physical environment.

2. The method as recited in claim 1, further comprising:
   determining a circumstance associated with the capture of the first sensor data; and
   presenting on a display a recommended capture technique or sensor setting.

3. The method as recited in claim 1, further comprising:
   determining, based at least in part on the sensor data, an identifier associated with the exterior physical environment;
   receiving, based at least in part on the identifier, third-party data associated with the exterior physical environment; and
   wherein generating the three-dimensional model is based at least in part on the third-party data.

4. The method as recited in claim 1, further comprising: presenting on the display at least one of:
   a trajectory to assist a user in capturing the second sensor data associated with the region; or
   a target to assist the user in capturing the second sensor data associated with the region.

5. The method as recited in claim 1, wherein presenting on a display a representation of the image data further comprises:
   estimating, based at least in part on the first image data, a geometry of an object associated with the exterior physical environment;
   generating, based at least in part on geometry, a preliminary three-dimensional model, the preliminary three-dimensional model different than the three-dimensional model; and
   presenting on the display the preliminary three-dimensional model as the representation of the first image data.

6. The method as recited in claim 1, wherein determining the alignment between the three-dimensional model and the interior model further comprises:
   determining a correspondence between a first object of the object data and a second object of the interior model, the correspondence including at least one of:
   a feature of the first object and the second object;
   a dimension of the first object and the second object; or
   a third object proximate to the first object and the second object.

7. The method as recited in claim 1, wherein:
   the first sensor data is captured at a first time;
   the second sensor data is captured at a second time, the second time subsequent to the first time; and
   the method further comprising:
   prior to generating the three-dimensional model, receiving third sensor data associated with the exterior physical environment, the third sensor data captured at a third time, the third time subsequent to the second time;
   aligning, based at least in part on the first item and the second time, the first sensor data with the second sensor data; and
   aligning, based at least in part on the second item and the third time, the second sensor data with the first sensor data.

8. The method as recited in claim 1, wherein generating the three-dimensional model associated with the exterior physical environment further comprises:
   determining, based at least in part on a constraint or a spatial relationship, an alignment between the first sensor data and the second sensor data.

9. The method as recited in claim 1, wherein detecting the region further includes at least one of:
   a gap or hole in the image data; or
   an obstruction of the object of interest.

10. One or more non-transitory computer-readable media storing instructions that, when executed, cause one or more processors to perform operations comprising:
    receiving first sensor data associated with an exterior physical environment, the first sensor data captured using a first capture technique and during a first session;
    determining, based at least in part on the first sensor data, at least one feature associated with the exterior physical environment;

in response to determining the at least one feature, determining a second capture technique, the second capture technique including a specific capture distance from the exterior physical environment and a specific sensor setting;

receiving second sensor data associated with the exterior physical environment, the second sensor data captured using a second capture technique and during a second session; and generating, based at least in part on the first sensor data and the second sensor data, a three-dimensional model associated with the exterior physical environment;

receiving an interior model associated with an interior of a building associated with the exterior physical environment, the interior model generated from additional image data that is nonoverlapping and differs from the first image data and the second image data;

segmenting the first image data and the second image data to generate object data associated with the building; and determining, based at least in part on the object data and the interior model, an alignment between the three-dimensional model of the exterior physical environment and the interior model of the interior of the exterior physical environment.

11. The one or more non-transitory computer-readable media as recited in claim 10, wherein the at least one feature is an anchor associated with localizing the second sensor data.

12. The one or more non-transitory computer-readable media as recited in claim 10, wherein the first capture technique is still images and the second capture technique is a continuous capture technique.

13. The one or more non-transitory computer-readable media as recited in claim 10, wherein:
the first sensor data includes position data or orientation data; and
aligning, based at least in part on the position data or the orientation data, the second sensor data with the first senor data.

14. A method comprising:
receiving sensor data associated with an exterior physical environment, the sensor data including image data of the exterior physical environment;
determining, based at least in part on the sensor data, an identifier associated with the exterior physical environment;
receiving, based at least in part on the identifier, third-party data associated with the exterior physical environment; and
generating, based at least in part on the image data and the third-party data, a three-dimensional model associated with the exterior physical environment, the third-party data including architectural or building codes;
receiving an interior model associated with an interior of a building associated with the exterior physical environment, the interior model generated from additional image data that is nonoverlapping and differs from the first image data and the second image data;
segmenting the first image data and the second image data to generate object data associated with the building; and
determining, based at least in part on the object data and the interior model, an alignment between the three-dimensional model of the exterior physical environment and the interior model of the interior of the exterior physical environment.

15. The method as recited in claim 14, wherein the exterior physical environment includes an object of interest and the method further comprises:
detecting, based at least in part on the image data, a region associated with the object of interest, the region including at least one of:
a gap or hole in the image data;
an obstruction of the object of interest; or
an area of detail less than a detail threshold; and
presenting on a display a representation of the image data, the representation highlighting the region.

16. The method as recited in claim 14, wherein:
the sensor data includes position data or orientation data;
determining the identifier associated with the exterior physical environment is based at least in part on the position data or the orientation data; and
the identifier is an address associated with a building associated with the exterior physical environment.

17. The method as recited in claim 14, wherein:
the third-party data includes third-party imagery of the exterior physical environment; and
generating the three-dimensional model is based at least in part on the third-party imagery.

18. The method as recited in claim 14, wherein the three-dimensional model is a first three-dimensional model of a building associated with the exterior physical environment and the method model further comprises:
receiving a second three-dimensional model, the second three-dimensional model associated with an interior of the building; and
generating, based at least in part on the first three-dimensional model and the second three-dimensional model, a joint model of the building.

19. The method as recited in claim 18, wherein:
the third-party data of the architectural or building codes includes a wall thickness associated with the building received from a third-party source; and
generating the joint model comprises aligning, based at least in part on the wall thickness, the first three-dimensional model and the second three-dimensional model.

20. The method as recited in claim 14, wherein determining the alignment between the three-dimensional model and the interior model further comprises:
determining a correspondence between a first object of the object data and a second object of the interior model, the correspondence including at least one of:
a feature of the first object and the second object;
a dimension of the first object and the second object; or
a third object proximate to the first object and the second object.

* * * * *